(12) United States Patent
Zheng

(10) Patent No.: US 9,959,237 B2
(45) Date of Patent: May 1, 2018

(54) METHOD AND APPARATUS FOR TRANSFERRING INFORMATION WITHIN AND BETWEEN SYSTEM-ON-CHIPS VIA INTRA-CHIP AND INTER-CHIP HOPPING BUSES

(71) Applicant: Marvell World Trade LTD., St. Michael (BB)

(72) Inventor: Hongming Zheng, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 481 days.

(21) Appl. No.: 14/564,499

(22) Filed: Dec. 9, 2014

(65) Prior Publication Data

US 2015/0169495 A1 Jun. 18, 2015

Related U.S. Application Data

(60) Provisional application No. 61/915,413, filed on Dec. 12, 2013, provisional application No. 61/915,486, filed on Dec. 12, 2013.

(51) Int. Cl.
*G06F 13/42* (2006.01)
*G06F 13/38* (2006.01)
*H04L 12/781* (2013.01)

(52) U.S. Cl.
CPC ........ *G06F 13/4221* (2013.01); *G06F 13/387* (2013.01); *G06F 13/385* (2013.01); *H04L 45/52* (2013.01)

(58) Field of Classification Search
CPC .. G06F 13/385; G06F 13/387; G06F 13/4221; H04L 45/52
See application file for complete search history.

(56) References Cited

U.S. PATENT DOCUMENTS 9,535,869 B2 1/2017 Zheng
2004/0044806 A1* 3/2004 Moll .................. G06F 13/1684
710/3
2007/0293984 A1 12/2007 Lin et al.
2008/0013609 A1 1/2008 Daxer et al.
(Continued)

OTHER PUBLICATIONS

Written Opinion for PCT Application No. PCT/US2014/069322 dated Feb. 27, 2015; 7 pages.
(Continued)

*Primary Examiner* — Eric Oberly

(57) ABSTRACT

A system-on-chip including non-hopping bus interfaces and a hopping bus. The non-hopping bus interfaces include a first non-hopping bus interface and a second non-hopping bus interface. The first non-hopping bus interface is configured to, based on a first protocol, receive information. The hopping bus includes intra-chip adaptors. The intra-chip adaptors are connected in series and respectively to the non-hopping bus interfaces. The intra-chip adaptors are configured to (i) according to a second protocol, convert the information into a first format for transmission over the hopping bus, and (ii) transfer the information in the first format over the hopping bus and between the intra-chip adaptors. The second protocol is different than the first protocol. The second non-hopping bus interface is configured to receive the information from the hopping bus based on the transmission of the information over the hopping bus.

20 Claims, 6 Drawing Sheets

(56) References Cited

U.S. PATENT DOCUMENTS

| | | | |
|---|---|---|---|
| 2010/0269123 A1* | 10/2010 | Mejdrich | H04L 43/0817 |
| | | | 719/318 |
| 2010/0312934 A1 | 12/2010 | Chi et al. | |
| 2013/0262733 A1* | 10/2013 | Boucard | G06F 13/4059 |
| | | | 710/309 |
| 2015/0012679 A1 | 1/2015 | Davis et al. | |

OTHER PUBLICATIONS

International Search Report for PCT Application No. PCT/US2014/069322 dated Feb. 27, 2015; 3 pages.
Kangmin Lee et al.; "Low-Power Network-on-Chip for High-Performance SoC Design"; IEEE Transactions on Very Large Scale Integration (VLSI) SYstems, vol. 14, No. 2; Feb. 1, 2006; pp. 148-160.
Mikkel B. Stensgaard et al.; "ReNoC: A Network-on-Chip Architecture with Reconfigurable Topology"; Second ACM/IEEE International Symposium on Networks-on-Chip; Apr. 7, 2008; pp. 55-64.
IEEE Std. 802.11-2012; (Revision of IEEE Std. 802.11-2007); IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.
802.16-2009 (Revision of IEEE Std. 802.16-2004); IEEE Standard for Local and Metropolitan area networks; Part 16: Air Interface for Broadband Wireless Access Systems; IEEE Computer Society and the IEEE Microwave Theory and Techniques Society; Sponsored by the LAN/MAN Standard Committee; May 29, 2009; 2082 pages.
IEEE Std 802.20-2008; IEEE Standard for Local and metropolitan area networks; Part 20: Air Interface for Mobile Broadband Wireless Access Systems Supporting Vehicular Mobility—Physical and Media Access Control Layer Specification; IEEE Computer Society; Sponsored by the LAN/MAN Standards Committee; Aug. 29, 2008; 1032 pages.
IEEE P802.11ah / D1.0 (Amendment to IEEE Std 802.11REVmc / D1.1, IEEE Std 802.11ac / D5.0 and IEEE Std 802.11af / D3.0) Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation; Prepared by the 802.11 Working Group of the LAN/MAN Standards Committee of the IEEE Computer Society; Oct. 2013; 394 pages.
IEEE P802.11ad / D5.0 (Draft Amendment based on IEEE P802.11REVmb D10.0) (Amendment to IEEE 802.11REVmb D10.0 as amended by IEEE 802.11ae D5.0 and IEEE 802.11aa D6.0); Draft Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications—Amendment 3: Enhancements for Very High Throughput in the 60 GHz Band; Sponsor IEEE 802.11 Committee of the IEEE Computer Society; Sep. 2011; 601 pages.
IEEE P802.11ac / D2.0; Draft STANDARD for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802 Committee; Jan. 2012; 359 pages.
requirements; Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802 Committee; Jan. 2012; 359 pages.

* cited by examiner

METHOD AND APPARATUS FOR TRANSFERRING INFORMATION WITHIN AND BETWEEN SYSTEM-ON-CHIPS VIA INTRA-CHIP AND INTER-CHIP HOPPING BUSES

CROSS-REFERENCE TO RELATED APPLICATIONS

This application claims the benefit of U.S. Provisional Application No. 61/915,413, filed on Dec. 12, 2013 and U.S. Provisional Application No. 61/954,486 filed on Mar. 17, 2014. The entire disclosures of the applications referenced above are incorporated herein by reference.

FIELD

The present disclosure relates to architectures of system-on-chips (SoCs) utilized for intra-chip and inter-chip transfers of information.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Advanced silicon manufacturing processes are allowing an ever increasing number of gates to be included in a given area of a SoC. Certain bus (or fabric) architectures have been introduced to allow for transfer of information (e.g., data, commands, parameters, addresses, etc.) between processor modules and interface control modules within a SoC. For example, an advanced microcontroller bus architecture (AMBA) is an on-chip interconnect specification for connection and management of modules in SoCs. One interface generation of AMBA is referred to as an advanced extensible interface (AXI).

A SoC having an AXI-based architecture may include multiple processor (or core) modules, a master AXI interconnection bus (or master fabric), a slave AXI interconnection bus (or slave fabric), and interface controllers. The processor modules control and/or access peripherals connected to the interface controllers via the interconnection buses. The AXI interconnection buses may be referred to as multi-level AXI fabrics and provide a mesh of interconnections between the processor modules and the interface controllers. The interface controllers may be connected respectively to peripheral devices and/or networks. The peripheral devices may include memory devices, such as a random access memory (RAM) or a read only memory (ROM). The peripheral devices may include a display, a flash drive, a hard disk drive, a hybrid drive, a camera, an embedded multi-media card (eMMC), an Ethernet device, a serial small computer system interface (SCSI) protocol (SSP) device, a device communicating via a universal asynchronous receiver transmitter (UART) interface, etc. The networks may include wireless or wired networks. An example of a wireless network is a wireless local area network (WLAN) such as a WiFi network.

The processor modules may be referred to as bus masters. The processor modules control and initiate operations of peripherals connected to the SoC. This may include the processor modules (or masters) transmitting commands to the interface controllers via the master AXI interconnection bus. Each of the interface controllers includes a master port (or interface) and a slave port (or interface). The master ports are connected to the master AXI interconnection bus. The slave ports are connected to the slave AXI interconnection bus. Commands may be transmitted to the master ports and then forwarded to the peripheral devices. Data may then be received from the peripheral devices at the slave ports. The slave AXI interconnection bus forwards the data from the slave ports to the processor modules.

In a SoC having an AXI architecture, each connection between the processor modules and the interface controllers includes multiple channels. The channels include a read address channel, a read data channel, a write address channel, a write data channel, a buffer write response channel, and a clock channel. These connections are provided via AXI bus interfaces of the processor modules and interface controllers. AXI bus interfaces may exist (i) between the processor modules and the AXI interconnection buses, and (ii) between the AXI connection buses and the interface control modules. The AXI bus interfaces and the AXI interconnection buses include a large number of wires. For example, write channels of an AXI bus interface may include as many as 224 wires for a parallel transfer of 128 bits. Read channels of an AXI bus interface may include as many as 208 wires for a parallel transfer of 128 bits. The slave AXI interconnection bus may include 200 wires for a parallel transfer of 32 bits. A 10-port AXI interconnection bus may include 5000 wires for a parallel transfer of 128 bits per port. S another example, a 10-port AXI interconnection bus may include 3000 wires for a parallel transfer of 32 bits per port. Additional wires are also required for transfer of interrupts. The AXI interconnection buses are large mesh networks of interconnections with limited data transfer speeds (e.g., 312 mega-hertz (MHz) or slower). Point-to-point transfer speeds between adjacent nodes in the mesh networks is also limited (e.g., 416 MHz) or slower.

The modules in a SoC with an AXI architecture operate based on a commonly shared clock. A clock signal is provided via a large clock tree of branches (or interconnections) in the AXI interconnection buses. As a result, communication between the modules is synchronous. If two of the modules are to operate based on different protocols (e.g., different AMBA protocols such as AXI and AMBA high-performance bus (AHB)) and/or different clocks (or clock signals having different frequencies), then a bridge is typically incorporated between the modules. The bridge allows for communication between two different domains having, for example, different bus widths (e.g., number of parallel transferred bits) and clock frequencies. Although integrators can be incorporated in the SoC to assure proper bandwidth and latency for the connections between the modules, allocation of bandwidth and control of access latency for each of the modules is difficult. This is because of the larger number of wires and interconnections between the modules and the distribution of the shared clock signal over the large mesh network.

It can be difficult to set the frequency of the clock signal to provide proper clock tree derating. Proper clock tree derating refers to setting the frequency of the clock signal to a highest frequency possible without negatively affecting operation and/or lifetime of a corresponding SoC. Increasing the frequency of the clock signal can increase process, voltage, and temperature (PVT) variations of the SoC. As a result, ability to increase the frequency of the clock can be limited due to the potential of increased PVT variations. The larger the clock tree, the slower the frequency of the clock signal.

SUMMARY

A first system-on-chip is provided and includes non-hopping bus interfaces and a hopping bus. The non-hopping bus interfaces include a first non-hopping bus interface and a second non-hopping bus interface. The first non-hopping bus interface is configured to, based on a first protocol, receive information. The hopping bus includes intra-chip adaptors. The intra-chip adaptors are connected in series and respectively to the non-hopping bus interfaces. The intra-chip adaptors are configured to (i) according to a second protocol, convert the information into a first format for transmission over the hopping bus, and (ii) transfer the information in the first format over the hopping bus and between the intra-chip adaptors. The second protocol is different than the first protocol. The second non-hopping bus interface is configured to receive the information from the hopping bus based on the transmission of the information over the hopping bus.

In other features, a method of forwarding information in a first system-on-chip, the first system-on-chip includes non-hopping bus interfaces and a hopping bus. The non-hopping bus interfaces include a first non-hopping bus interface and a second non-hopping bus interface. The hopping bus includes intra-chip adaptors. The intra-chip adaptors are connected in series and respectively to the non-hopping bus interfaces. The method includes: receiving information, based on a first protocol, at the first non-hopping bus interface of a first system-on-chip; according to a second protocol, converting the information, via the intra-chip adaptors, into a first format for transmission over the hopping bus, where the second protocol is different than the first protocol; transferring the information in the first format over the hopping bus and between the intra-chip adaptors; and receiving the information from the hopping bus at the second non-hopping bus interface based on the transmission of the information over the hopping bus.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
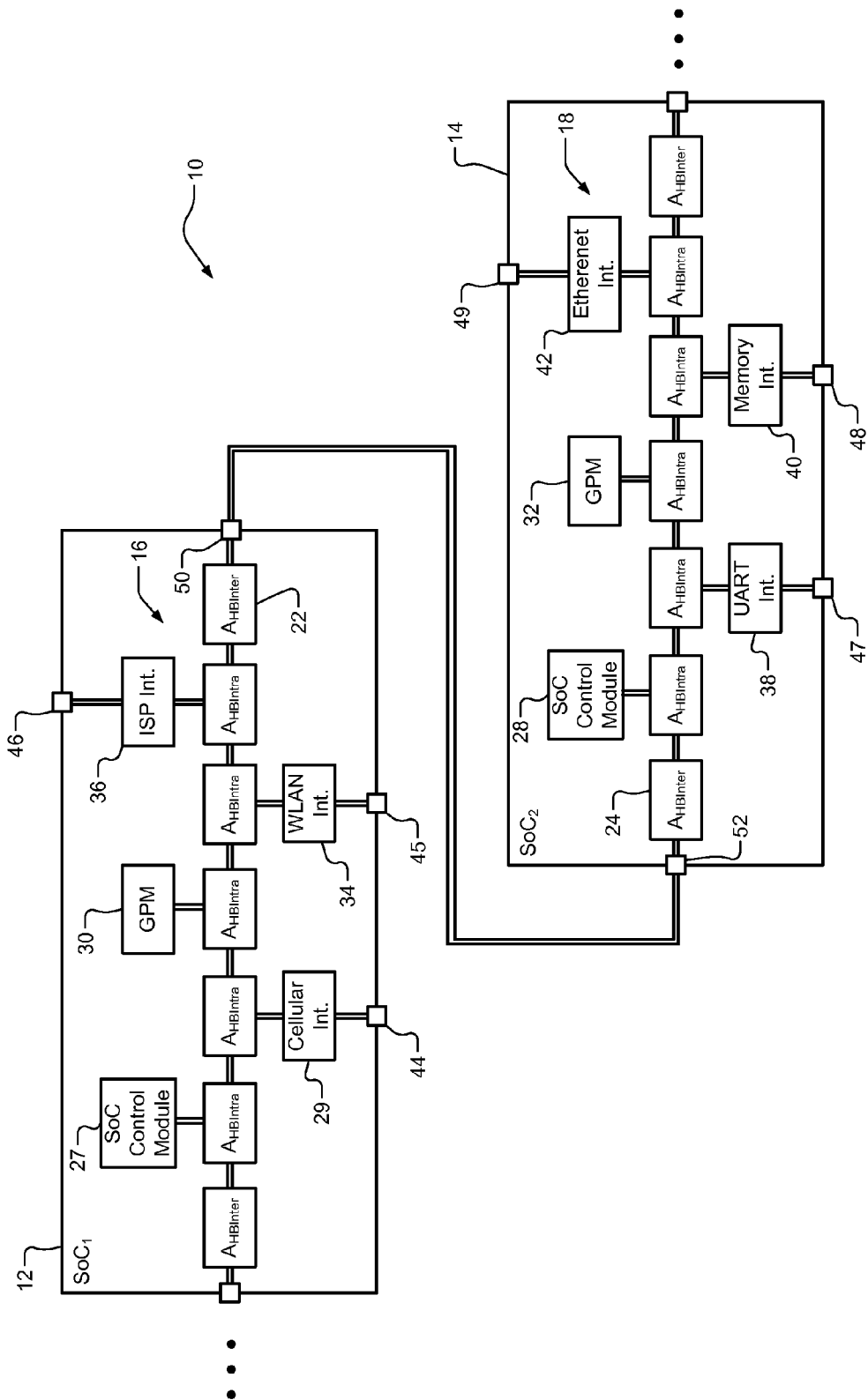
FIG. 1 is a functional block diagram of a hopping bus (HB) system in accordance with an embodiment of the present disclosure.

The examples disclosed below introduce hopping bus (HB) architectures for SoCs. The SoCs includes intra-chip HBs, intra-chip HB adaptor modules, and inter-chip HB adaptor modules. The intra-chip HBs include and provide connections between the intra-chip HB adaptor modules. An inter-chip HB includes extends between the SoCs, includes the inter-chip HB adaptor modules, and provides connections between the inter-chip HB adaptor modules. A HB refers to a bus that includes intra-chip HB adaptor modules and/or inter-chip HB adaptor modules and corresponding conductive elements and buffers as disclosed herein. A HB provides a path for information to hop from HB adaptor modules to HB adaptor modules until arriving at a destination. The HB adaptor modules may perform protocol translation, packetizing, sampling, skew control, unique identification, serialization, and/or deserialization. A HB operates and forwards information according to a HB protocol, as is further described below.

The HB architectures increases system partitioning ease, which allows system designers to focus on functions of modules and/or SoCs rather than focusing on layouts of SoCs. This is because each of the modules may be easily located in different areas on a SoC. The modules and the SoCs are able to communicate with each other via a single HB protocol. The modules may operate based on different clock signals, may have different transfer rates, port or interface widths, etc. Each of the modules is provided with a HB adaptor module to allow for transfer of information over one or more intra-chip HBs and one or more inter-chip HBs. The intra-chip HBs and the inter-chip HBs serve as one or more "highways" of parallel transmission elements (e.g., electrically conductive elements) for efficient transfer of information between modules and SoCs.

The HB architectures allow for easy integration of newly designed modules and/or SoCs. The HB architectures also allow for easy integration and reuse of the same software in different modules and/or different types of SoCs, as each of the modules and SoCs are able to communicate via allocated HB adaptor modules using the same HB protocol. The intra-chip HB adaptor modules packetize information including interrupts, which allows for efficient transfer of the information and interrupts. This is done without need for additional designated channels and/or wires for interrupts. The inter-chip adaptor modules provide address mapping to allow for transfer of information between SoCs using the same HB protocol.

The HB architectures allow for high-speed transfer of information via unidirectional asynchronous interconnections. Each of the HB adaptor modules has respective transmit and receive connections. Each of the connections is unidirectional. Modules and/or SoCs may operate based on different clock signals having different clock frequencies. The intra-chip HBs and the inter-chip HBs transfer information independent of the clock signals of the SoCs. The intra-chip HBs and the inter-chip HBs include timing modules that provide skew control based on an HB clock frequency. This provides parallel and pseudo-synchronous transfer of information between HB adaptor modules. Operation of the HB systems and corresponding HB architectures are described in further detail below.

FIG. 1 shows a HB system 10 incorporating multiple SoCs 12, 14. The SoCs 12, 14 include respective intra-chip HBs 16, 18 and are connected to each other via an inter-chip HB 20. Each of the intra-chip HBs 16, 18 includes multiple intra-chip HB adaptor modules (hereinafter referred to as intra-chip HB adaptors) $A_{HBIntra}$ connected in series between a pair of inter-chip HB adaptor modules (hereinafter referred to as intra-chip HB adaptors) $A_{HBInter}$. The inter-chip HB adaptors $A_{HBInter}$ are configured to connect to other inter-chip HB adaptors via a corresponding inter-chip HB. For example, an inter-chip HB adaptor 22 is connected to the inter-chip HB adaptor 24 via the inter-chip HB elements 26. As shown, conductive elements extend between consecutive pairs of the HB adaptors $A_{HBIntra}$, $A_{HBInter}$. Although a certain number of conductive elements are shown, any number of conductive elements may be included in the HBs 16, 18, 20. Each of the intra-chip HB adaptors $A_{HBIntra}$ may be connected to a module and/or an interface, such as SoC control modules 27, 28, cellular interface 29, graphics processing modules (GPMs) 30, 32, WLAN interface 34, image signal processor (ISP) interface 36, universal asynchronous receiver/transmitter (UART) interface 38, memory interface 40, and Ethernet interface 42. The interfaces 29, 34, 36, 38, 40, 42 may be connected to respective devices via ports 44, 45, 46, 47, 48, 49.

Although the intra-chip HB adaptors $A_{HBIntra}$ are shown as being connected to certain modules and interfaces, the intra-chip HB adaptors $A_{HBIntra}$ may be connected to other modules and interfaces. For example, the intra-chip HB adaptors $A_{HBIntra}$ may be connected to: a serial interface such as a universal serial bus (USB) interface; a serial advanced technology attachment (SATA) interface; and a peripheral component interconnect express (PCIe) interface. One or more of each of the modules and/or interfaces may be included in each of the SoCs 12, 14. The memory interface 40 may be connected to volatile and/or non-volatile memory, such as a dynamic random access memory (DRAM), a double data rate (DDR) memory, a read only memory (ROM), a solid state drive (SDD), a hard disk drive, a hybrid drive, an embedded multi-media card (eMMC), etc.

The SoC control modules 27, 28 may each include one or more processing modules (or masters) and cache and may control operation of the other modules and/or interfaces. The interfaces may communicate with respective wireless and/or wired networks, peripheral devices (e.g., cameras, printers, modems, copiers, etc.), and/or other devices via respective ports. Each of the SoC control modules 27, 28 accesses the modules and interfaces of a corresponding one of the SoCs 12, 14 via the corresponding intra-chip HBs 16, 18 and the intra-chip HB adaptors $A_{HBIntra}$. Each of the SoC control modules 27, 28 accesses the modules and interfaces of other SoCs via a corresponding one of the intra-chip HBs 16, 18, the inter-chip HBs (e.g., the inter-chip HB 20) and the HB adaptors $A_{HBIntra}$, $A_{HBInter}$. For example, one of the SoC control modules 27, 28 may send a command (or request signal) to one of the intra-chip HBs 16, 18. The command may be forwarded to one of the modules and/or interfaces via the inter-chip HB and/or the inter-chip HB 20. In response to the command, data may be returned to the SoC control module via the one of the intra-chip HBs 16, 18 and/or the inter-chip HB 20.

The SoCs 12, 14 may be connected to each other via ports 50, 52 as shown and/or via the inter-chip HB adaptors 22, 24. The ports 50, 52 may be included in the inter-chip HB adaptors 22, 24. Each of the HB adaptors $A_{HBIntra}$, $A_{HBInter}$ may include two or more ports, where each of the ports is a transmit port or a receive port. Each of the ports may be referred to as a master port and/or a slave port, depending upon whether information is being sent to or from (i) a master device, module or interface, or (ii) a slave device, module or interface.

Figure 2:
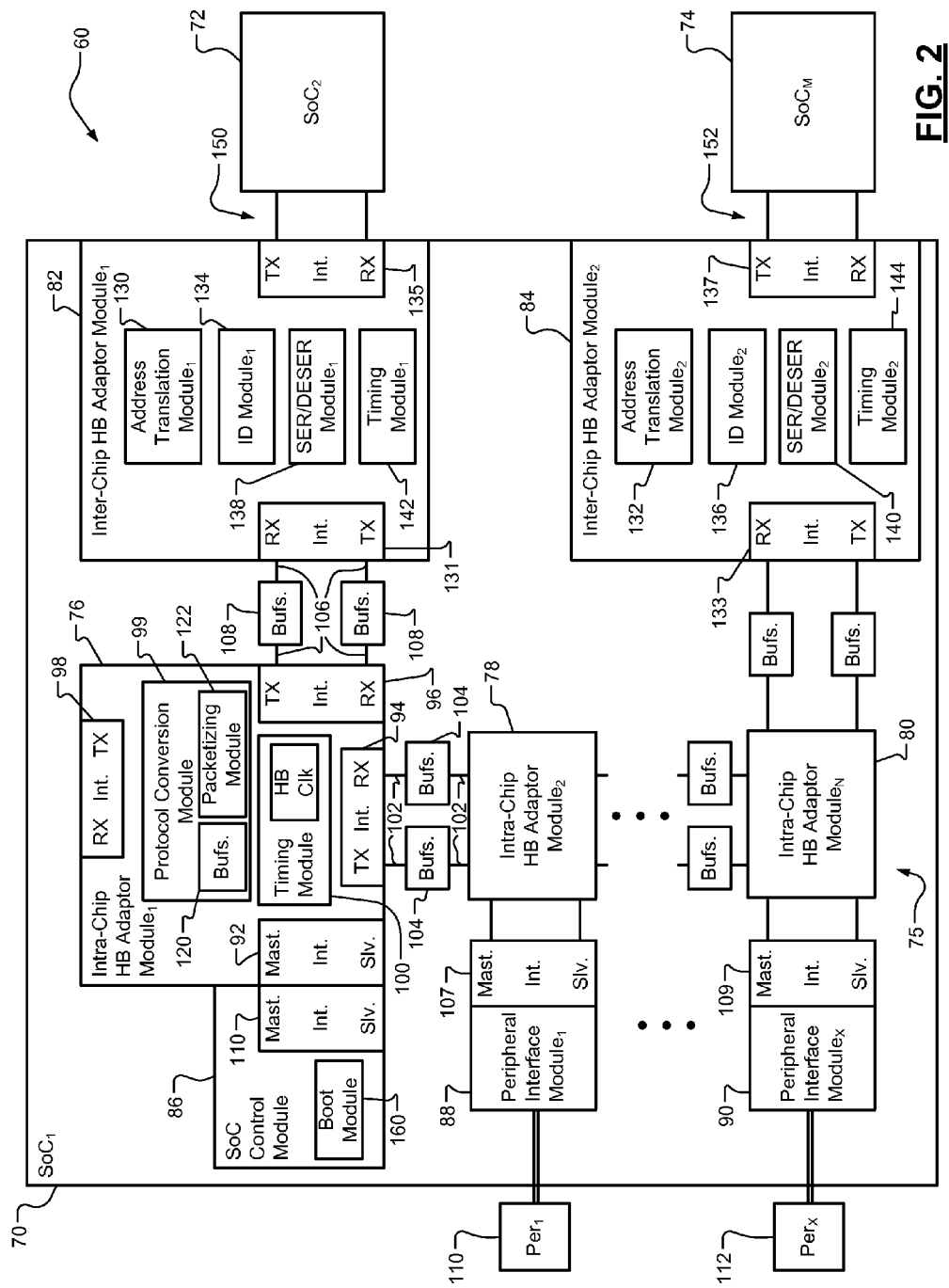
FIG. 2 is a functional block diagram of another HB system incorporating multiple SoCs and illustrating intra-chip HB adaptor modules and inter-chip HB adaptor modules in accordance with an embodiment of the present disclosure.

FIG. 2 shows a hopping bus system 60 that includes multiple SoCs 70, 72, 74. The first SoC 70 includes an intra-chip HB 75. The intra-chip HB 75 includes intra-chip HB adaptors 76, 78, 80 that are connected in series between a pair of inter-chip HB adaptors 82, 84. The HB adaptors 76, 78, 80, 82, 84 may replace any of the corresponding HB adaptors of FIG. 1. The intra-chip HB adaptors 76, 78, 80 may be connected to a SoC control module 86, peripheral interface modules 88, 90, and/or other modules and/or interfaces (some of which are mentioned above). Each of the intra-chip HB adaptors 76, 78, 80 may include non-HB and HB interfaces (example interfaces 92, 94, 96, 98 are shown), a protocol conversion module (an example protocol conversion module 99 is shown), and a timing module (an example timing module 100 is shown). A non-HB interface transfers information to and from a corresponding HB adaptor according to a non-HB protocol. A HB interface transfers information to and from a corresponding HB adaptor according to a HB protocol. The non-HB and HB interfaces are connected, via respective master, slave, transmit, and/or receive ports, to the SoC control module 86, the peripheral interface modules 88, 90, interfaces of adjacent intra-chip HB adaptors, and/or interfaces of the inter-chip HB adaptors 82, 84. Although the first intra-chip HB adaptor 76 is shown as including interfaces, a protocol conversion module, and a timing module, the other intra-chip HB adaptors (e.g., the intra-chip HB adaptors 78, 80) may each include respective interfaces, a protocol conversion module, and a timing module.

The first intra-chip HB adaptor 76 includes: the first interface 92 connected to the SoC control module 86; the second interface 94 connected to the second intra-chip HB adaptor 78 via conductive elements 102 and buffers 104; the third interface 96 connected to the inter-chip HB adaptor 82 via conductive elements 106 and buffers 108; and the fourth interface 98. The first interface 92 is a non-HB interface and includes master and slave ports corresponding to master and slave ports of an interface 110 of the SoC control module 86. The other interfaces 94, 96, 98 are HB interfaces. The fourth interface 98 may be connected to another intra-chip HB adaptor, the last intra-chip HB adaptor (e.g., the intra-chip HB adaptor 80); or another inter-chip HB adaptor. As an example, the buffers 102, 106 may be located on upper metal layers of the first SoC 70, whereas the SoC control module 86, the peripheral interface modules 88, 90, and/or other modules may be located in layers lower (i.e. closer to a substrate of the first SoC 70) than the upper metal layers. The peripheral interface modules 88, 90 include respective interfaces 107, 109 that are connected to respective peripheral devices 110, 112.

The intra-chip HB adaptors 76, 78, 80 may be linked together, as shown, and may loop back by connecting the first intra-chip HB adaptor 76 to the last intra-chip HB adaptor 80. Each of the intra-chip HB adaptors 76, 78, 80 may be connected to one or more SoCs (e.g., the SoCs 72, 74) via respective inter-chip HB adaptors (e.g., the inter chip HB adaptors 82, 84). Although two inter-chip HB adaptors are shown, additional inter-chip HB adaptors may be incorporated in the first SoC 70 and may be connected to any one of the intra-chip HB adaptors 76, 78, 80. The intra-chip HB adaptors 76, 78, 80 may each include any number of interfaces for connecting to any number of modules, interfaces, and/or HB adaptors.

The interfaces (e.g., the interface 92) of the intra-chip HB adaptor modules 76, 78, 80, that are connected to (i) the SoC control module 86, (ii) the peripheral interface modules 88, 90, and/or (iii) other modules and/or interfaces connected to the intra-chip HB 75, may be referred to as non-HB interfaces. The non-HB interfaces may include respective master ports and slave ports. The master ports and slave ports may operate and/or transfer information to and from the SoC control module 86, the peripheral interface modules 88, 90 and/or other modules and/or interfaces via a same or different non-HB protocols. The non-HB protocols may be based on a same clock signal or different clock signals. The non-HB protocols may be, for example, an advanced microcontroller bus architecture (AMBA), an advanced extensible interface (AXI) protocol, and AMBA high-performance bus (AHB). The SoC control module 86, the peripheral interface modules 88, 90 and/or other modules and/or interfaces may transfer information to and from the intra-chip HB 75 (i) according to one or more of the non-HB protocols, and (ii) based on one or more of the clock signals. The other interfaces (e.g., the interfaces 94, 96, 98) of the intra-chip HB adaptors 76, 78, 80 may be referred to as HB interfaces and transfer information according to an HB protocol. The intra-chip HP adaptors 76, 78, 80 are configured to receive information from the non-HB interfaces regardless of the clock signal used to transfer the information.

The protocol conversion module 99 may include buffers 120 and a packetizing module 122. The protocol conversion module 99 converts information received according to one or more of the non-HB protocols to information in a format that is according to the HB protocol. The received information may be stored in the buffers 120 and then packetized by the packetizing module 122. As a result, packets having a header and a body are generated. The header may include a source address, a destination address, and a number of bits to be transferred and/or accessed. The body may include commands, requested information, data and/or other information. The packetizing module 122 may also packetize interrupts and transmit the interrupts similar and/or along with other information between the HB adaptors 76, 78, 80, 82, 84 via corresponding HB interfaces, buffers, and conductive elements. This eliminates a need for additional lines, conductive elements, and/or channels for interrupts.

The timing module 100 may include a HB clock 124 that generates a HB clock signal. Although the timing module 100 and the HB clock 124 are shown as being part of the first intra-chip HB adaptor 76, the timing module 100 and/or the HB clock 124 may be part of any of the HB adaptors 76, 78, 80, 82, 84 and/or may be separate from the HB adaptors 76, 78, 80, 82, 84 and provide the HB clock signal to the HB adaptors 76, 78, 80, 82, 84. The HB adaptors 76, 78, 80, 82, 84 may share the same HB clock signal. The same HB clock signal may be shared by HB adaptors of the SoCs 70, 72, 74. The timing module and/or the packetizing module of each of the HB adaptors 76, 78, 80, 82, 84 may incorporate the HB clock signal in information signals forwarded from the corresponding HB adaptor to one of the other HB adaptors.

The timing module 100 may also perform skew control. This may include sampling information (or packets) received on parallel channels at a corresponding interface of an intra-chip HB adaptor based on the HB clock signal. Skew control assures that bits of information forwarded on parallel channels between HB adaptors are received within a predetermined period of each other. This provides parallel propagation of information and alignment of signals. There may be any number of receive channels and transmit channels and corresponding conductive elements extending in parallel between the HB adaptors and corresponding buffers.

The inter-chip HB adaptors 82, 84 include: HB interfaces 131, 133 connected to the intra-chip HB adaptors 76, 78; and HB interfaces 135, 137 connected to the inter-chip HBs 150, 152. The inter-chip HB adaptors 82, 84 include address translation modules 130, 132, identifier (ID) modules 134, 136, serializer/deserializer (SER/DER) modules 138, 140, and timing modules 142, 144. For outgoing information, the address translation modules may translate local addresses, provided in packets received from intra-chip HB adaptors, to global addresses. A local address may be recognizable to the local chip and not to other chips. A global address may be recognizable to the local chip and to other chips. A local address may refer to an address of a memory location in a local chip and/or a memory device connected to a local chip. A global address may refer to an address of a memory location in a remote chip and/or in a memory device connected to the remote chip. For in-coming information, an address translation module may translate a global address received from a remote SoC to a local address of a local SoC of the address translation module.

The ID modules 134, 136 may add one or more unique IDs to headers of packets received from the intra-chip HB adaptors 76, 78, 80. The unique IDs may be unique to a SoC, a source module (a module requesting and/or providing information), a source interface (an interface requesting and/or providing information), and/or an inter-chip HB adaptor. A unique ID may be assigned via, for example, software executed by an ID module. As an example, one of the address translation modules 130, 132 may receive a local 40 bit address from the intra-chip HB 75 and generate global 48 bit address based on a unique ID provided by one of the ID modules 134, 136.

The SER/DER modules 138, 140 may serialize information (or packets) being transmitted from the inter-chip HB adaptors 82, 84 on respectively the inter-chip HBs 150, 152 and deserialize information (or packets) being received from the SoCs 72, 74 via the inter-chip HBs 150, 152. The timing modules 142, 144 may operate similar to the timing module 100 of the intra-chip HB adaptor 76 including transmission of the HB clock signal and skew control.

The modules 86, 88, 90 (and other modules and/or interfaces connected to the intra-chip HB adaptors 76, 78, 80) may operate based on respective macros. The macros may be chip specific and/or may be reused in different types of chips due to the configurations and operations of the intra-chip HB adaptors 76, 78, 80. This is because a clock signal associated with each of the macros does not need to match and/or be modified to match a clock signal of the corresponding chip. Clock matching is not needed because the intra-chip HB adaptors 76, 78, 80 are able to operate regardless of when information is received.

The intra-chip HB adaptors 76, 78, 80 may be aware of timing of the macros. This may be preprogrammed into the intra-chip HB adaptors 76, 78, 80 and/or may be based on communication with and/or clock signals received from the modules 86, 88, 90 (and other modules and/or interfaces connected to the intra-chip HB adaptors 76, 78, 80). Thus, the intra-chip adaptors 76, 78, 80 may be able to determine when information is to be received from the modules 86, 88, 90 (and other modules and/or interfaces connected to the intra-chip HB adaptors 76, 78, 80) and respond accordingly. In another embodiment and with respect to receiving information from the modules 86, 88, 90 (and other modules and/or interfaces connected to the intra-chip HB adaptors 76, 78, 80), the intra-chip HB adaptors 76, 78, 80 may be time unaware and buffer the received information.

The intra-chip HB 75 provides standardized interchangeable connection points (i.e. the intra-chip HB adaptors 76, 78, 80) with top level routing and timing between the interchangeable connection points. Asynchronous transfer of information may occur between (i) the modules 86, 88, 90 and other modules and/or interfaces connected to the intra-chip HB adaptors 76, 78, 80, and (ii) the intra-chip HB adaptors 76, 78, 80. Transfer of information between the HB adaptors 76, 78, 80, 82, 84 may be referred to as pseudo-synchronous due to the skew control performed. Incorporating the interchangeable connection points allows for easy verification and silicon implantation of the interchangeable connection points.

The HB interfaces may be referred to as combined master and slave interfaces and transfer information in a parallel format via respective transmit and receive conductive elements (e.g., the conductive elements 102, 106). The transmit and receive conductive elements may each be unidirectional. As an example, the transmit conductive elements may include 128 data elements and 16 strobe elements. The receive conductive elements may also include 128 data elements and 16 strobe elements. This is different than a traditional AXI cross-mesh configuration, where, for example, device A is connected to devices B-D via respective branches of the cross-mesh configuration extending from device A. The disclosed HB system 60 allows devices A-D to be connected via a serial HB such that each of the devices A-D is able to communicate with each of the other devices A-D by forwarding information serially between HB adaptors of the HB. The information is forwarded from the source device (e.g., device A) and between the HB adaptors until arriving at the intra-chip HB adaptor closest to the destination device (e.g., destination device D).

The SoC control module 86 may include a boot module 160. The boot module 160 may boot-up the modules and adaptors of the first SoC 70 and/or other SoCs (e.g., the SoCs 72, 74). The boot module 160 may instruct the other SoCs when to boot up and where respective boot-up code for the SoCs are stored. The boot-up codes may be stored in the first SoC 72, the other SoCs and/or in memory separate from the first SoC 72 and/or other SoCs. The other SoCs may boot up based on instructions from the first SoC 72. The other SoCs may boot up based on respective stored and preset bits, preset pins, and/or preset fuses in the other SoCs indicating whether to self-boot or boot-up based on the instructions from the first SoC 72. The instructions may be provided in an inter-chip HB (IHB) ready signal, as further described below. Operation of the boot module 160 is described in more detail with respect to FIGS. 5 and 6.

Figure 3:
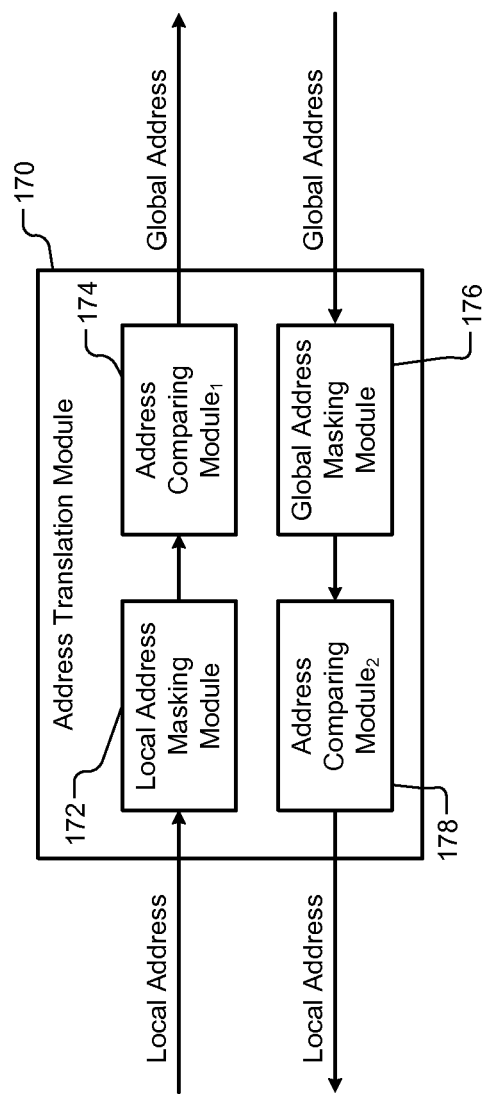
FIG. 3 is a functional block diagram of an address translation module in accordance with an embodiment of the present disclosure.

FIG. 3 shows an address translation module 170. The address translation module 170 may replace any of the address translation modules of FIG. 2. The address translation module 170 includes a local address masking module 172, a first address comparing module 174, a global address masking module 176, and a second address comparing module 178. The local address masking module 172 may indicate a number of bits of a local address to compare with a predetermined number of global addresses. The first address comparing module 174 compares the local address or a portion thereof to one or more global addresses to find a match. If a match is found, then the matched global address is used in replacement of the local address.

For example, the local address masking module 172 may indicate that a first 32 bits of 48 bits of the local address are to be compared with a first 32 bits of each of the predetermined number of global addresses until a match is found. The predetermined number of global addresses may be stored in respective registers and compared with the local address. These comparisons may be performed in parallel (or during a same period of time). The local address is then remapped to a matching global address via the first address comparing module 174.

The global address masking module 176 may indicate a number of bits of a global address to compare with a predetermined number of local addresses. The second address comparing module 178 compares the global address or a portion thereof to one or more local addresses to find a match. If a match is found, then the matched local address is used in replacement of the global address.

For example, the global address masking module 176 may indicate that a first 32 bits of 48 bits of the global address are to be compared with a first 32 bits of each of the predetermined number of local addresses until a match is found. The predetermined number of local addresses may be stored in respective registers and compared with the global address. These comparisons may be performed in parallel (or during a same period of time). The global address is then remapped to a matching local address via the second address comparing module 178.

The global address may not be remapped to a local address if being forwarded from a current SoC to another SoC via one or more intra-chip HBs and one or more inter-chip HBs. The remapping may occur at a final destination SoC. This is referred to as bypassing one or more chips.

Figure 4:
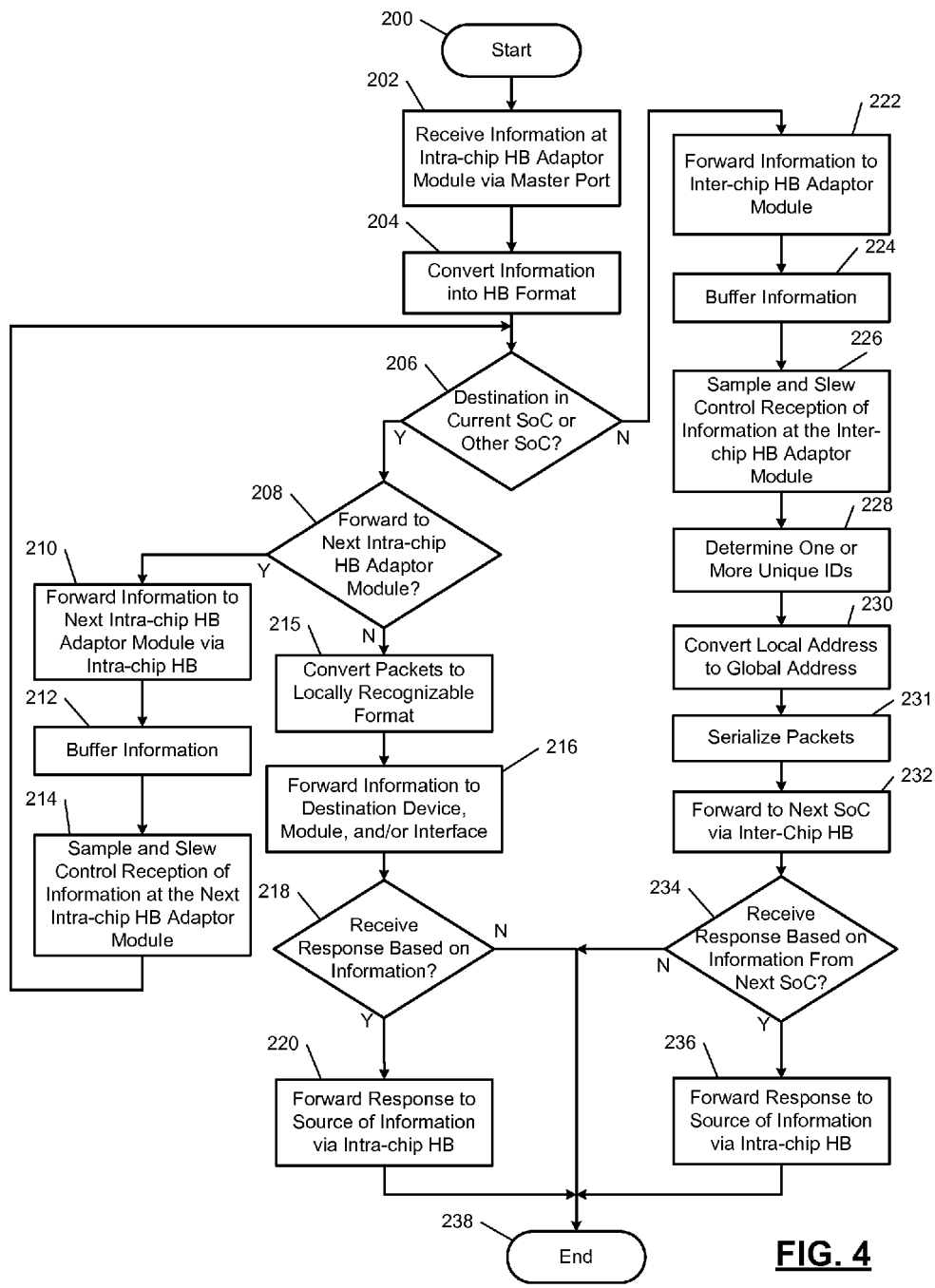
FIG. 4 illustrates a method of operating a HB system in accordance with an embodiment of the present disclosure.

The systems disclosed herein may be operated using numerous methods, an example method is illustrated in FIG. 4. In FIG. 4, a method of operating a HB system (e.g., one of the HB systems 10, 60 of FIGS. 1-2) is shown. Although the following tasks are primarily described with respect to the implementations of FIGS. 1-3, the tasks may be easily modified to apply to other implementations of the present disclosure. The tasks may be iteratively performed.

The method may begin at 200. At 202, a first intra-chip HP adaptor (e.g., the intra-chip HB adaptor 76) receives information (e.g., a command) from a module (e.g., the SoC control module 86). The information may be received via a master port of a non-HB interface of the first intra-chip adaptor.

At 204, a protocol conversion module converts the information received into the HB protocol. The received information may be of different types, may have been received at different rates, and/or may have been transmitted based on different clock frequencies. Regardless of the protocol of the information received, the protocol conversion module converts the information into a HB format according to the HB protocol. This may include a packetizing module packetizing the information and adding a header to one or more packets. The header may include a source address, a destination address, a source chip unique ID, a destination chip unique ID, a source module unique ID, and/or a destination module unique ID. The source and destination addresses may not be addresses of SoCs, but rather may refer to memory locations in or external to the SoCs and/or addresses of devices connected to the SoCs.

At 206, the first intra-chip HP adaptor may determine, based on any or all information in the header, whether the one or more packets generated at 204 are to be (i) forwarded internally from the current intra-chip adaptor module to a current SoC, or (ii) sent to another SoC. If the packets are to remain in the current SoC, task 208 is performed, otherwise task 222 is performed.

At 208, the first intra-chip HP adaptor may determine, based on any or all information in the header, whether the one or more packets generated at 204 are to be forwarded to a next intra-chip HB adaptor module. If the packets are to be forwarded to a next intra-chip HB adaptor module along an intra-chip HB, task 210 is performed, otherwise task 215 is performed.

At 210, the information and a HB clock signal are forwarded from the current (or previous) intra-chip HB adaptor module to the next intra-chip HB adaptor module via an intra-chip HB. The packets are spread over multiple available parallel channels between the HB adaptor modules. At 212, prior to being received at the next intra-chip HB adaptor module, the information is buffered via buffers (e.g., the buffers 102) between the previous intra-chip HB adaptor module and the next intra-chip HB adaptor module. At 214, bits of the packets as received on the channels and at the next inter-chip HB adaptor module are sampled based on the HB clock signal. The sampling may be adjusted to perform slew control to adjust rates at which the bits are received at each of the channels. This aids in assuring that the bits transmitted over parallel channels and within a first predetermined period of each other are received within a second predetermined period of each other. The second predetermined period may be a same length as the first predetermined period. Subsequent to task 214, task 206 may be performed where the next intra-chip HB adaptor module is now the current intra-chip HB adaptor module.

At 215, the information in the form of the packets is converted by a protocol conversion module of the next intra-chip HB adaptor module to a format recognizable to a destination device. The information may be in a same format as and/or based on a same protocol as the information transmitted by the source device or may be in a different format and/or based on a different protocol. At 216, the converted information is forwarded from the intra-chip HB to the destination device, module and/or interface. At 218, the latest intra-chip HB adaptor module determines whether a response has been received from the destination device, module and/or interface based on the information. If a response has been received, task 220 is performed, otherwise the method may end at 238.

At 220, a response is received at the latest intra-chip HB adaptor module from the destination device, module and/or interface and is forwarded to the source of the information via the intra-chip HB. The response may include, for example, data that was stored in a memory. The forwarding of the response may occur in a reverse order in which the information was sent to the destination device, module and/or interface.

At 222, the information is forwarded from the current intra-chip HB adaptor module to an inter-chip HB adaptor module (e.g., the inter-chip HB adaptor 82). At 224, prior to being received at the inter-chip HB adaptor module, the information is buffered. At 226, the inter-chip HB adaptor module samples the information received. This may include skew control as described above and may be based on the HB clock signal as received from the last intra-chip HB adaptor module (previously referred to as current intra-chip HB adaptor module) at the inter-chip HB adaptor module.

At 228, an ID module (e.g., the ID module) determines one or more unique IDs. At 230, the address translation module may translate a local address to a global address based on the one or more unique IDs. The headers of the packets may be modified based on the one or more unique IDs and the determined global address. At 231, the serializer/deserializer module serializes the bits of the packets. At 232, the inter-chip HB adaptor module forwards the serialized bits to the next SoC via an inter-chip HB. Although the packets are serialized, packets may be transmitted via parallel channels between the previous SoC and the next SoC, where each channel includes serialized bits of respective packets. The bits of packets may be transmitted over one or more channels to the next SoC.

At 234, the inter-chip HB adaptor module determines whether a response from the next SoC has been received based on the packets transmitted via the inter-chip HB. The response may include, for example, data or boot code that was stored in the next chip or a device connected to the next chip. If a response has been received, task 236 is performed, otherwise the method may end at 238. At 236, the response is forwarded to the source of the information via the intra-chip HB. This may be done in a reverse order in which the information was transmitted.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

Figure 5:
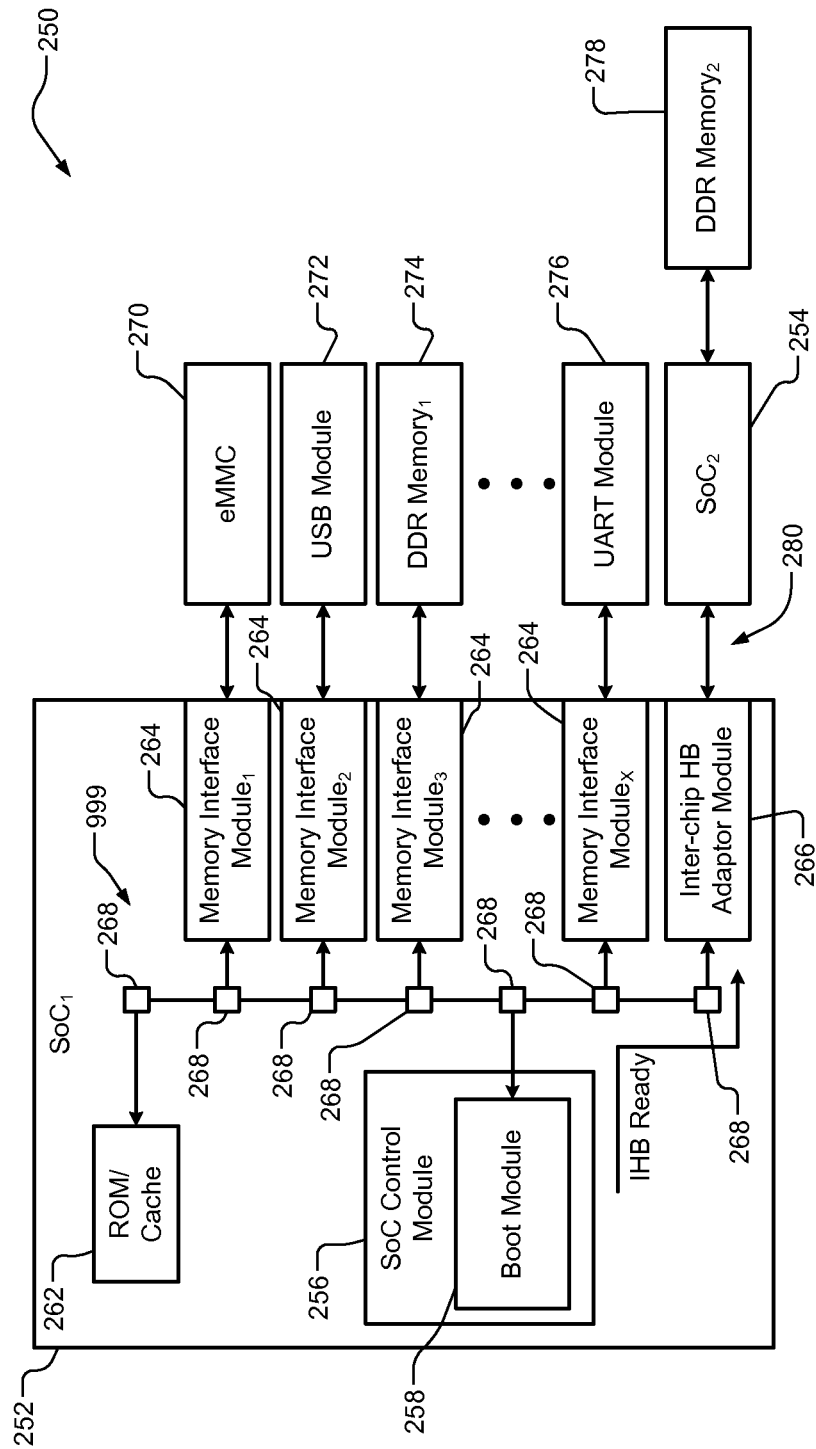
FIG. 5 is a function block diagram of a HB system for cross-chip boot up control in accordance with an embodiment of the present disclosure.

FIG. 5 shows a HB system 250 configured to perform cross-chip boot up control. The HB system 250 includes a first SoC 252 and a second SoC 254. The first SoC 252 may be referred to as a "base" or "master boot" chip and the second SoC 254 may be referred to as a "subordinate" chip. The first SoC 252 includes: a SoC control module 256 with a boot module 258; a HB 260; a ROM and/or cache 262; memory interface modules 264; and an inter-chip HB adaptor module 266. The HB 260 includes intra-chip HB adaptor modules 268 connected respectively to the ROM and/or cache 262, the memory interface modules 264, and the inter-chip HB adaptor module 266. The intra-chip HB adaptor modules 268 may be configured similar to the intra-chip HB adaptor modules of FIG. 2. The memory interface modules 264 are connected to memory devices, such as an eMMC 270, a USB module 272, a DDR memory 274 and a UART module 276. The inter-chip HB adaptor module 266 is connected to the second SoC 254 via an inter-chip HB 280, which may be connected to another memory device (e.g., a second DDR memory 278). The HB system 250 is further described with respect to FIG. 6.

Figure 6:
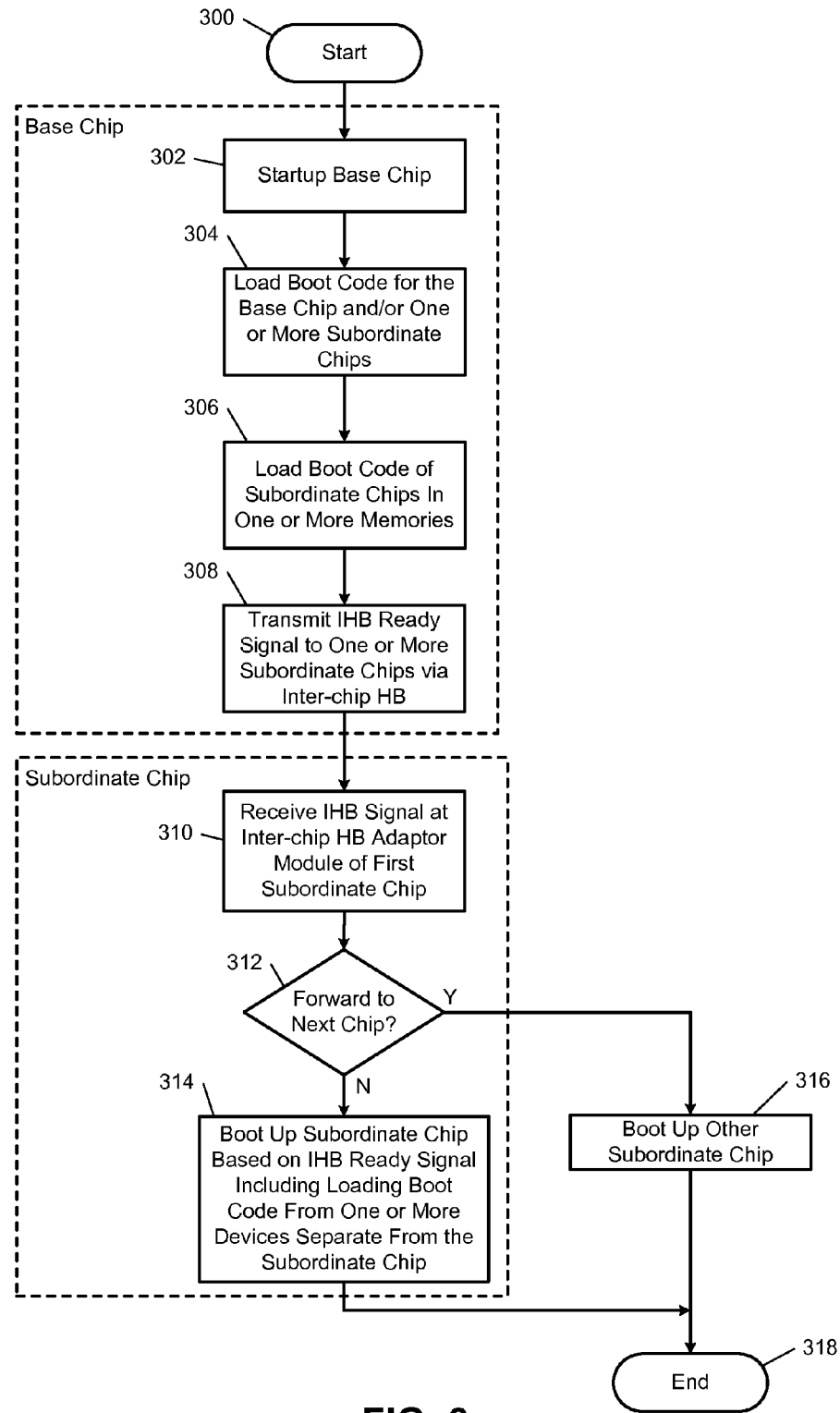
FIG. 6 illustrates a boot method in accordance with an embodiment of the present disclosure.

FIG. 6 shows a boot method. Although the following tasks are primarily described with respect to the implementations of FIG. 5, the tasks may be easily modified to apply to other implementations of the present disclosure. The tasks may be iteratively performed.

The method may begin at 300. The following tasks 302-308 are associated with a base chip (e.g., the first SoC 252). At 302, the base chip is started up (e.g., powered ON). At 304, the base chip loads boot code for the base chip and/or one or more subordinate chips (e.g., the second SoC 254) in one or more memories (or memory devices), such as in one or more of the memory devices 262, 270, 272, 274, 276. This may include loading boot code into cache of the base chip or transferring boot code between two or more of the memory devices. At 306, if not already performed at 304, the boot code of the subordinate chips may be loaded.

At 308, the base chip and/or corresponding boot module may generate an inter-chip HB (IHB) ready signal indicate that the base chip, an inter-chip HB, an intra-chip HB of the base chip, and boot code are ready for the subordinate chips. The IHB ready signal may indicate where boot code for each of the subordinate chips and/or modules of the subordinate chips is located. The IHB signal is transmitted via the inter-chip HB from the base chip to the subordinate chips. If more than one subordinate chip is receiving the IHB ready signal, the IHB ready signal may be forwarded from a first subordinate chip to a second subordinate chip or may be forwarded directly from the base chip to each of the subordinate chips.

Tasks 310-314 associated with a first subordinate chip. At 310, the first subordinate chip receives the IHB signal at an inter-chip HB adaptor module of the first subordinate chip. At 312, the inter-chip HB adaptor module of the first subordinate chip determines whether to forward the IHB signal to a second subordinate HB chip. If the IHB signal is not to be forwarded, task 314 is performed, otherwise task 316 is performed.

At 314, the first subordinate chip determines whether to boot up based on the IHB signal. This may include a control module of the first subordinate chip determining whether to access boot code according to the IHB signal and/or boot up based on code stored in the first subordinate chip and/or a memory device connected to the first subordinate chip. The first subordinate chip may (i) generate an access request signal to load boot code according to the IHB signal, and (ii) based on the access request signal, receive boot code from the base SoC and/or a memory device internal to and/or connected to the base SoC. The access request signal may be sent via intra-chip HB adaptors, intra-chip HBs, inter-chip HB adaptors, and an inter-chip HB back to the control module of the base SoC and/or to the memory in or connected to the base SoC. The boot code may then be sent via the intra-chip HB adaptors, intra-chip HBs, inter-chip HB adaptors, and an inter-chip HB to the control module of the first subordinate SoC.

At 316, a second subordinate SoC may boot up according to the IHB signal. Subsequent to tasks 314, 316, the method may end at 318.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory circuits (such as a flash memory circuit or a mask read-only memory circuit), volatile memory circuits (such as a static random access memory circuit and a dynamic random access memory circuit), and secondary storage, such as magnetic storage (such as magnetic tape or hard disk drive) and optical storage.

The apparatuses and methods described in this application may be partially or fully implemented by a special purpose computer created by configuring a general purpose computer to execute one or more particular functions embodied in computer programs. The computer programs include processor-executable instructions that are stored on at least one non-transitory, tangible computer-readable medium. The computer programs may also include or rely on stored data. The computer programs may include a basic input/output system (BIOS) that interacts with hardware of the special purpose computer, device drivers that interact with particular devices of the special purpose computer, one or more operating systems, user applications, background services and applications, etc.

The computer programs may include: (i) assembly code; (ii) object code generated from source code by a compiler;

(iii) source code for execution by an interpreter; (iv) source code for compilation and execution by a just-in-time compiler, (v) descriptive text for parsing, such as HTML (hypertext markup language) or XML (extensible markup language), etc. As examples only, source code may be written in C, C++, C#, Objective-C, Haskell, Go, SQL, Lisp, Java®, ASP, Perl, Javascript®, HTML5, Ada, ASP (active server pages), Perl, Scala, Erlang, Ruby, Flash®, Visual Basic®, Lua, or Python®.

None of the elements recited in the claims is intended to be a means-plus-function element within the meaning of 35 U.S.C. § 112(f) unless an element is expressly recited using the phrase "means for", or in the case of a method claim using the phrases "operation for" or "step for".

What is claimed is:

1. A first system-on-chip comprising:
a plurality of non-hopping bus interfaces comprising a first non-hopping bus interface and a second non-hopping bus interface, wherein the first non-hopping bus interface is configured to, based on a first protocol, receive information;
a hopping bus comprising a plurality of intra-chip adaptors,
wherein
the plurality of intra-chip adaptors are connected in series and respectively to the plurality of non-hopping bus interfaces,
the plurality of intra-chip adaptors are configured to (i) according to a second protocol, convert the information into a first format for transmission over the hopping bus, and (ii) transfer the information in the first format over the hopping bus and between the plurality of intra-chip adaptors,
the second protocol is different than the first protocol, and
the second non-hopping bus interface is configured to receive the information from the hopping bus based on the transmission of the information over the hopping bus;
a control module configured to (i) load boot code for the first system-on-chip and a second system-on-chip, and (ii) transmit a ready signal to a first intra-chip adaptor, wherein the ready signal indicates the boot code for the second system-on-chip is ready, and wherein the plurality of intra-chip adaptors comprise the first intra-chip adaptor; and
a first inter-chip adaptor configured to (i) transfer the ready signal from the first intra-chip adaptor to the second system-on-chip via an inter-chip bus, and (ii) based on the ready signal, receive an access signal from the second system-on-chip, and (iii) based on the access signal, transfer the boot code for the second system-on-chip to the second system-on-chip, wherein the inter-chip bus extends between the first system-on-chip and the second system-on-chip.

2. The first system-on-chip of claim 1, wherein:
the plurality of intra-chip adaptors comprise a second intra-chip adaptor;
the first intra-chip adaptor comprises a third non-hopping bus interface and a first hopping bus interface;
the third non-hopping bus interface is connected to the first non-hopping bus interface and is configured to receive the information according to the first protocol from the first non-hopping bus interface;
the first intra-chip adaptor is configured to, according to the second protocol, convert the information into the first format for transmission over the hopping bus including packetizing the information to generate one or more packets; and
the first hopping bus interface is configured to forward the one or more packets in the first format to the second intra-chip adaptor.

3. The first system-on-chip of claim 2, wherein:
the second intra-chip adaptor is configured to (i) convert the one or more packets in the first format to a second format according to a third protocol, and (ii) forward the information in the second format to the second non-hopping bus interface; and
the third protocol is different than the second protocol.

4. The first system-on-chip of claim 3, wherein the third protocol is different than the first protocol.

5. The first system-on-chip of claim 2, wherein:
the first intra-chip adaptor is configured to spread bits of the one or more packets over a plurality of channels or a plurality of conductive elements between the first intra-chip adaptor and the second intra-chip adaptor; and
the second intra-chip adaptor is configured to (i) receive the bits of the one or more packets via the plurality of channels or the plurality of conductive elements, and (ii) based on a clock signal of the hopping bus, sample the bits of the one or more packets to skew control reception of the bits of the one or more packets at the second intra-chip adaptor such that the bits are received via the plurality of channels within a predetermined period of time of each other.

6. The first system-on-chip of claim 1, wherein the first protocol is an advanced microcontroller bus architecture.

7. The first system-on-chip of claim 1, wherein each of the plurality of non-hopping bus interfaces is configured to connect to a module within the first system-on-chip or a peripheral device.

8. The first system-on-chip of claim 1, wherein:
the first non-hopping bus interface comprises a first master port and a first slave port;
the hopping bus interface comprises a second master port and a second slave port;
the first master port is connected to the second master port;
the first slave port is connected to the second slave port; and
the information is transferred (i) between the first master port and the second master port, or (ii) between the first slave port and the second slave port.

9. A first system-on-chip comprising:
a plurality of non-hopping bus interfaces comprising a first non-hopping bus interface and a second non-hopping bus interface, wherein the first non-hopping bus interface is configured to, based on a first protocol, receive information;
a hopping bus comprising a plurality of intra-chip adaptors; and
an inter-chip adaptor configured to transfer information between a first intra-chip adaptor and an inter-chip bus,
wherein
the plurality of intra-chip adaptors are connected in series and respectively to the plurality of non-hopping bus interfaces,
the plurality of intra-chip adaptors are configured to (i) according to a second protocol, convert the information into a first format for transmission over the hopping bus, and (ii) transfer the information in the first format over the hopping bus and between the plurality of intra-chip adaptors, the second protocol is different than the first protocol, the second non-hopping bus interface is configured to receive the information from the hopping bus based on the transmission of the information over the hopping bus, the plurality of intra-chip adaptors comprise the first intra-chip adaptor, the first intra-chip adaptor is configured to packetize the information to generate a packet having a header, the header comprises a local address, and the inter-chip adaptor is configured to (i) determine a unique identifier for the first system-on-chip, (ii) based on the unique identifier, translate the local address to a global address, and (iii) via an inter-chip hopping bus and according to the second protocol, forward the one or more packets with the global address to a second system-on-chip.

10. The first system-on-chip of claim 9, wherein the inter-chip adaptor is configured to serialize the one or more packets prior to forwarding the one or more packets to the second system-on-chip.

11. A first system-on-chip comprising:

a plurality of non-hopping bus interfaces comprising a first non-hopping bus interface and a second non-hopping bus interface, wherein the first non-hopping bus interface is configured to, based on a first protocol, receive information;

a hopping bus comprising a plurality of intra-chip adaptors, wherein the plurality of intra-chip adaptors are connected in series and respectively to the plurality of non-hopping bus interfaces, the plurality of intra-chip adaptors are configured to (i) according to a second protocol, convert the information into a first format for transmission over the hopping bus, and (ii) transfer the information in the first format over the hopping bus and between the plurality of intra-chip adaptors, the second protocol is different than the first protocol, and the second non-hopping bus interface is configured to receive the information from the hopping bus based on the transmission of the information over the hopping bus;

an inter-chip adaptor connected to a first intra-chip adaptor via an inter-chip bus, wherein the inter-chip adaptor is configured to (i) receive a ready signal from a second system-on-chip, and (ii) forward the ready signal to the first intra-chip adaptor, wherein the plurality of intra-chip adaptors comprise the first intra-chip adaptor; and a control module configured to (i) receive the ready signal from the first intra-chip adaptor, (ii) based on the ready signal, determine whether to boot up the first system-on-chip based on (i) boot code accessed via the inter-chip bus and stored in a memory in the second system-on-chip or connected to the second system-on-chip, or (ii) boot code stored in a memory in the first system-on-chip or connected to the first system-on-chip.

12. The first system-on-chip of claim 11, wherein the control module is configured to (i) generate an access signal based on the ready signal, (ii) transmit the ready signal to the second system-on-chip via the inter-chip bus, and (iii) receive the boot code and stored in a memory in the second system-on-chip or connected to the second system-on-chip.

13. A hopping bus system comprising:

the first system-on-chip of claim 1;

a second system-on-chip comprising a second hopping bus and a second inter-chip adaptor; and the inter-chip bus connecting the first inter-chip adaptor to the second inter-chip adaptor.

14. A hopping bus system comprising:

a first system-on-chip comprising a plurality of non-hopping bus interfaces comprising a first non-hopping bus interface and a second non-hopping bus interface, wherein the first non-hopping bus interface is configured to, based on a first protocol, receive information;

a first hopping bus comprising a plurality of intra-chip adaptors;

a first inter-chip adaptor connected to a first intra-chip adaptor;

a control module configured to (i) generate a request signal, and (ii) based on the first protocol, transmit the request signal to the first intra-chip adaptor a second system-on-chip comprising a second hopping bus and a second inter-chip adaptor; and an inter-chip bus connecting the first inter-chip adaptor to the second inter-chip adaptor, wherein the plurality of intra-chip adaptors comprise the first intra-chip adaptor, the plurality of intra-chip adaptors are connected in series and respectively to the plurality of non-hopping bus interfaces, the plurality of intra-chip adaptors are configured to (i) according to a second protocol, convert the information into a first format for transmission over the hopping bus, and (ii) transfer the information in the first format over the hopping bus and between the plurality of intra-chip adaptors, the second protocol is different than the first protocol, the second non-hopping bus interface is configured to receive the information from the hopping bus based on the transmission of the information over the hopping bus, the first intra-chip adaptor is configured to (i) packetize the request signal to generate a packet according to the second protocol, and (ii) forward the packet to the first inter-chip adaptor, the first inter-chip adaptor is configured to (i) add a unique identifier to the packet, (ii) serialize the packet, and (iii) forward the serialized packet to the inter-chip bus, the second inter-chip adaptor is configured to (i) deserialize the packet, and (ii) forward the packet to a third intra-chip adaptor, and the third intra-chip adaptor is configured to (i) access data stored in a memory based on the packet, and (ii) forward the data to the control module via the second inter-chip adaptor, the inter-chip bus, the first inter-chip adaptor, and the first intra-chip adaptor.

15. A method of forwarding information in a first system-on-chip and between the first system-on-chip and a second system-on-chip, the first system-on-chip comprises a plurality of non-hopping bus interfaces and a hopping bus, wherein the plurality of non-hopping bus interfaces comprise a first non-hopping bus interface and a second non-hopping bus interface, wherein the hopping bus comprises a plurality of intra-chip adaptors, wherein the plurality of intra-chip adaptors are connected in series and respectively to the plurality of non-hopping bus interfaces, wherein an inter-chip adaptor is connected to a first intra-chip adaptor via an inter-chip bus, and wherein the plurality of intra-chip adaptors comprise the first intra-chip adaptor, the method comprising:

receiving information, based on a first protocol, at the first non-hopping bus interface of a first system-on-chip;

according to a second protocol, converting the information, via the plurality of intra-chip adaptors, into a first format for transmission over the hopping bus, wherein the second protocol is different than the first protocol;

transferring the information in the first format over the hopping bus and between the plurality of intra-chip adaptors;

receiving the information from the hopping bus at the second non-hopping bus interface based on the transmission of the information over the hopping bus;

receiving at the inter-chip adaptor a ready signal from a second system-on-chip;

forwarding the ready signal from the inter-chip adaptor to the first intra-chip adaptor;

receiving the ready signal from the first intra-chip adaptor at the first system-on-chip; and based on the ready signal, determining whether to boot up the first system-on-chip based on (i) boot code accessed via the inter-chip bus and stored in a memory in the second system-on-chip or connected to the second system-on-chip, or (ii) boot code stored in a memory in the first system-on-chip or connected to the first system-on-chip.

16. The method of claim 15, further comprising:

receiving the information according to the first protocol from the first non-hopping bus interface at a third non-hopping bus interface of the first intra-chip adaptor, wherein the plurality of intra-chip adaptors comprise the first intra-chip adaptor and a second intra-chip adaptor, and wherein the first intra-chip adaptor comprises the third non-hopping bus interface and a hopping bus interface;

according to the second protocol, convert the information into the first format for transmission over the hopping bus via the first intra-chip adaptor, wherein the converting of the information includes packetizing the information to generate one or more packets; and forwarding the one or more packets in the first format to the second intra-chip adaptor via the first hopping bus interface.

17. The method of claim 16, further comprising:

convert the one or more packets in the first format to a second format according to a third protocol via the second intra-chip adaptor, wherein the third protocol is different than the second protocol; and forwarding the information in the second format to the second non-hopping bus interface.

18. The method of claim 17, wherein the third protocol is different than the first protocol.

19. The method of claim 16, further comprising:

spreading, via the first intra-chip adaptor, bits of the one or more packets over a plurality of channels or a plurality of conductive elements between the first intra-chip adaptor and the second intra-chip adaptor;

receiving the bits of the one or more packets at the second intra-chip adaptor via the plurality of channels or the plurality of conductive elements; and based on a clock signal of the hopping bus, sampling the bits of the one or more packets to skew control reception of the bits of the one or more packets at the second intra-chip adaptor.

20. A first system-on-chip comprising:

a plurality of non-hopping bus interfaces comprising a first non-hopping bus interface and a second non-hopping bus interface, wherein the first non-hopping bus interface is configured to, based on a first protocol, receive information; and a hopping bus comprising a plurality of intra-chip adaptors, wherein the plurality of intra-chip adaptors are connected in series and respectively to the plurality of non-hopping bus interfaces, the plurality of intra-chip adaptors are configured to (i) according to a second protocol, convert the information into a first format for transmission over the hopping bus, and (ii) transfer the information in the first format over the hopping bus and between the plurality of intra-chip adaptors, the second protocol is different than the first protocol, the second non-hopping bus interface is configured to receive the information from the hopping bus based on the transmission of the information over the hopping bus, the plurality of intra-chip adaptors comprise a first intra-chip adaptor and a second intra-chip adaptor, the first intra-chip adaptor is configured to, according to the second protocol, convert the information into the first format for transmission over the hopping bus including packetizing the information to generate one or more packets, the first intra-chip adaptor is configured to spread bits of the one or more packets over a plurality of channels or a plurality of conductive elements between the first intra-chip adaptor and the second intra-chip adaptor, and the second intra-chip adaptor is configured to (i) receive the bits of the one or more packets via the plurality of channels or the plurality of conductive elements, and (ii) based on a clock signal of the hopping bus, sample the bits of the one or more packets to skew control reception of the bits of the one or more packets at the second intra-chip adaptor such that the bits are received via the plurality of channels within a predetermined period of time of each other.

* * * * *

UNITED STATES PATENT AND TRADEMARK OFFICE
CERTIFICATE OF CORRECTION

PATENT NO. : 9,959,237 B2
APPLICATION NO. : 14/564499
DATED : May 1, 2018
INVENTOR(S) : Hongming Zheng Page 1 of 1

It is certified that error appears in the above-identified patent and that said Letters Patent is hereby corrected as shown below:

On the Title Page

Column 1, Line 61, under Related U.S. Application Data:
Delete "61/915,486" and insert --61/954,486--

Column 1, Line 62, under Related U.S. Application Data:
Delete "Dec. 12, 2013" and insert --Mar. 17, 2014--

Signed and Sealed this
Nineteenth Day of June, 2018

Andrei Iancu
*Director of the United States Patent and Trademark Office*